April 1, 1941.  U. M. W. KÖLM  2,237,150
DIVIDING MACHINE
Filed May 18, 1935   12 Sheets-Sheet 1

INVENTOR.
Ulrich M. W. Kölm
by W. M. Wilson
ATTORNEY

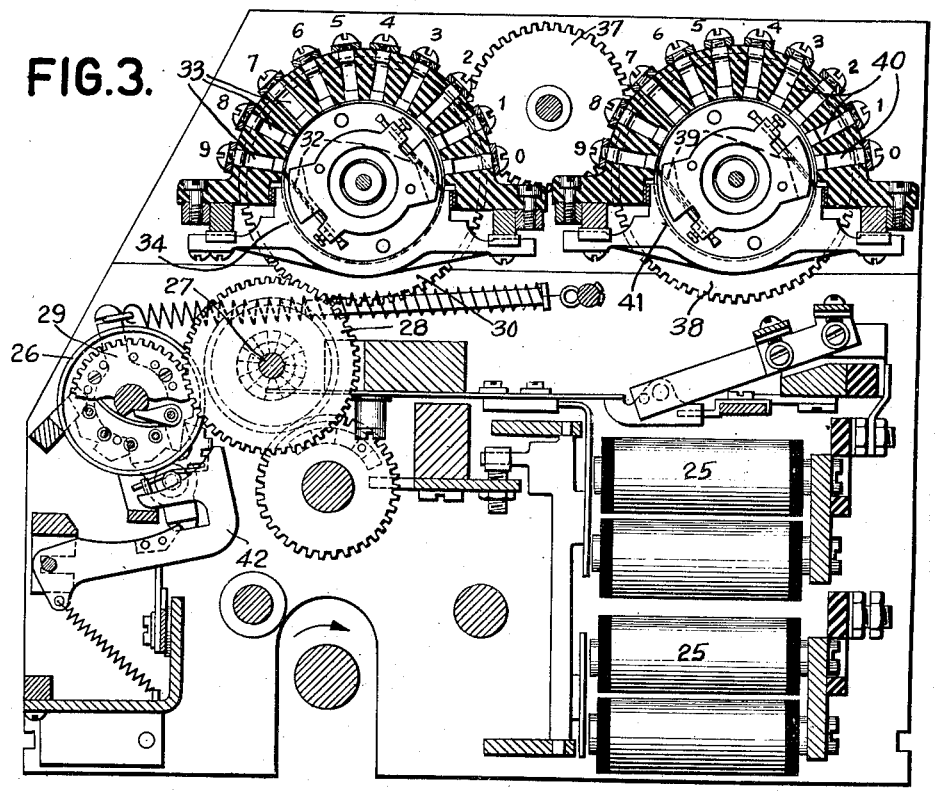
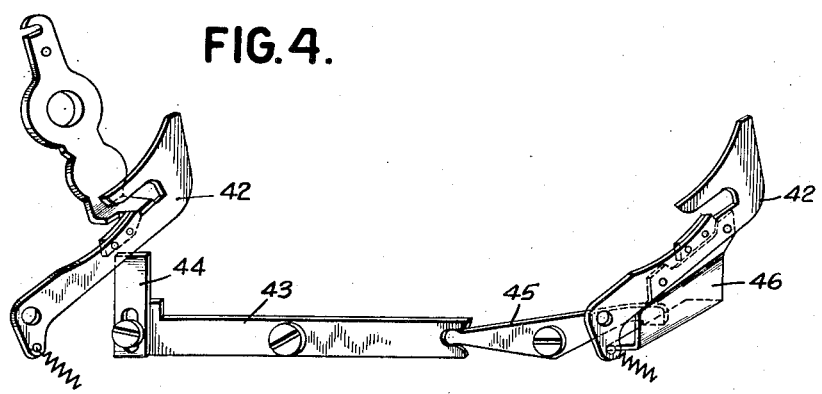

April 1, 1941.                    U. M. W. KÖLM                    2,237,150
                                DIVIDING MACHINE
                            Filed May 18, 1935          12 Sheets-Sheet 3
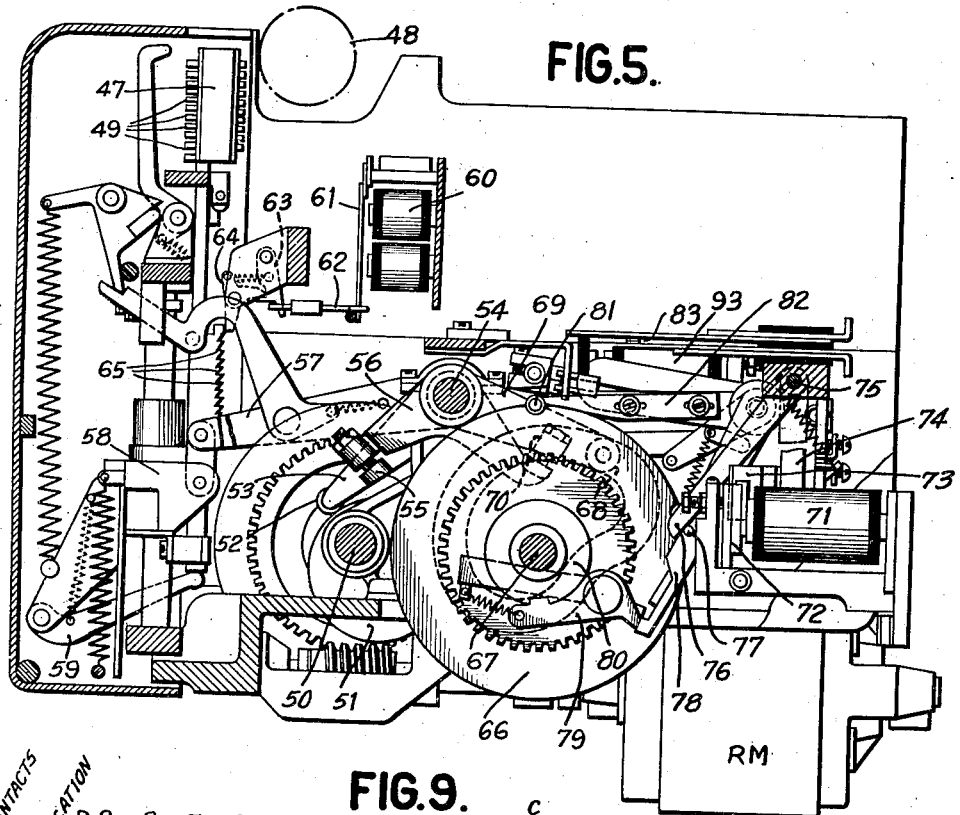

April 1, 1941.    U. M. W. KÖLM    2,237,150
DIVIDING MACHINE
Filed May 18, 1935    12 Sheets-Sheet 5

| Quotient Acc.#4 | Dividend Acc.#2 | |
|---|---|---|
| H T U | HM TM M HTH TTH TH H T U | |
| 0 0 0 | 0–0 2 5 3 4 6 0 0 | Compare–D'r>D'd–Shift |
| 1 | 9 9 9 2 5 9 2 | 1st. Transfer Cycle |
| 1 | 0–0 1 7 9 3 8 0 0 | Compare–D'r<D'd |
| 1 | 9 9 9 2 5 9 2 | 2nd Transfer Cycle |
| 2 | 0–0 1 0 5 3 0 0 0 | Compare D'r<D'd |
| 1 | 9 9 9 2 5 9 2 | 3rd Transfer Cycle |
| 3 | 0–0–0 3 1 2 2 0 0 | Compare–Shift D'r>D'd |
| 1 | 9 9 9 9 2 5 9 2 | 4th Transfer Cycle |
| 3 1 | 0–0–0 2 3 8 1 2 0 | Compare D'r<D'd |
| 1 | 9 9 9 9 2 5 9 2 | 5th. Transfer Cycle |
| 3 2 | 0–0–0 1 6 4 0 4 0 | Compare D'r<D'd |
| 1 | 9 9 9 9 2 5 9 2 | 6th Transfer Cycle |
| 3 3 | 0–0–0–0 8 9 9 6 0 | Compare D'r<D'd–No Shift |
| 1 | 9 9 9 9 2 5 9 2 | 7th Transfer Cycle |
| 3 4 | 0–0–0–0 1 5 8 8 0 | Compare D'r>D'd–Shift |
| 1 | 9 9 9 9 9 2 5 9 2 | 8th Transfer Cycle |
| 3 4 1 | 0–0–0–0 0 8 4 7 2 | Compare D'r<D'd–No Shift |
| 1 | 9 9 9 9 9 2 5 9 2 | 9th Transfer Cycle |
| 3 4 2 | 0–0–0–0 0 1 0 6 4 | Compare |

INVENTOR
Ulrich M. W. Kölm
BY
U. M. Kölm
ATTORNEY

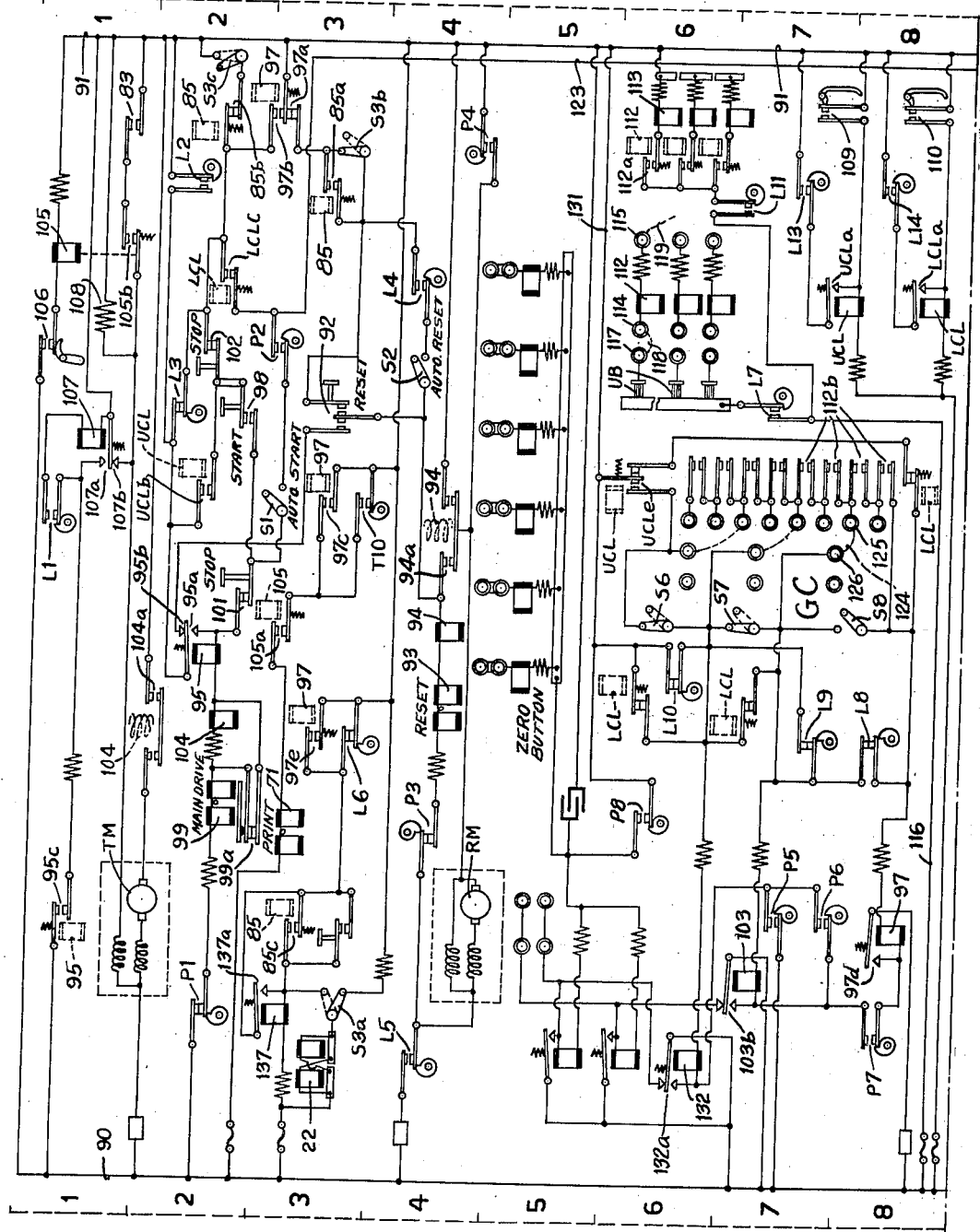

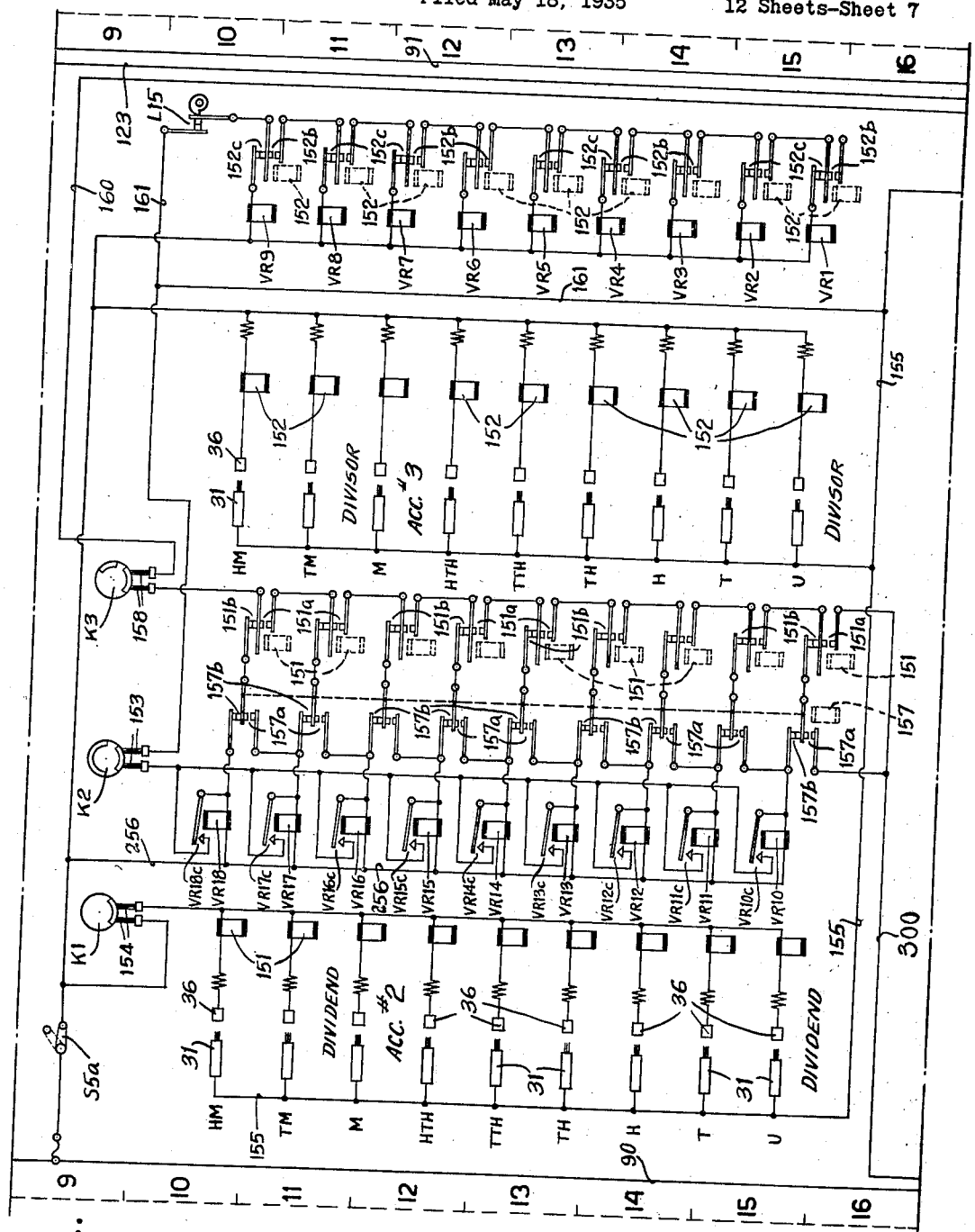

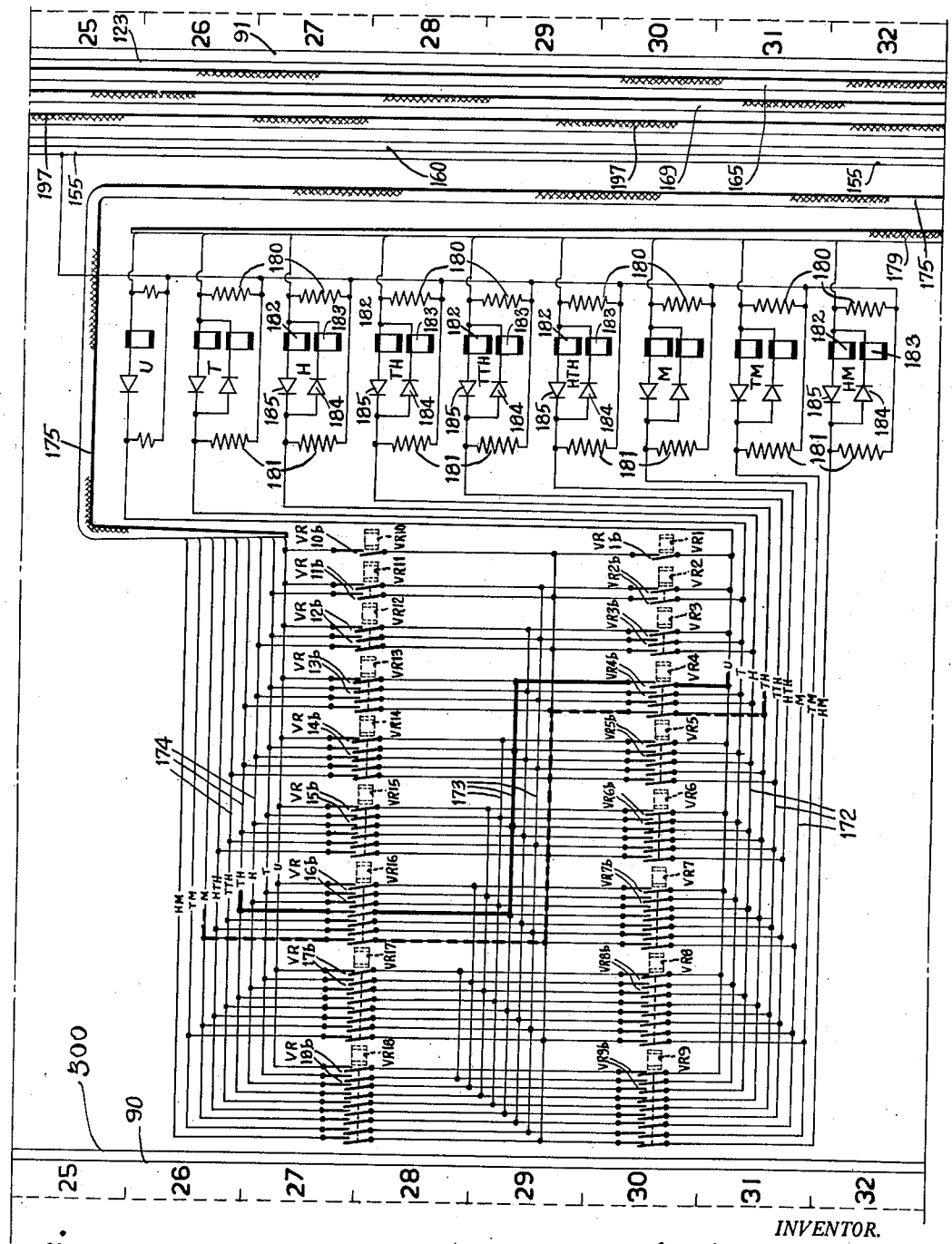

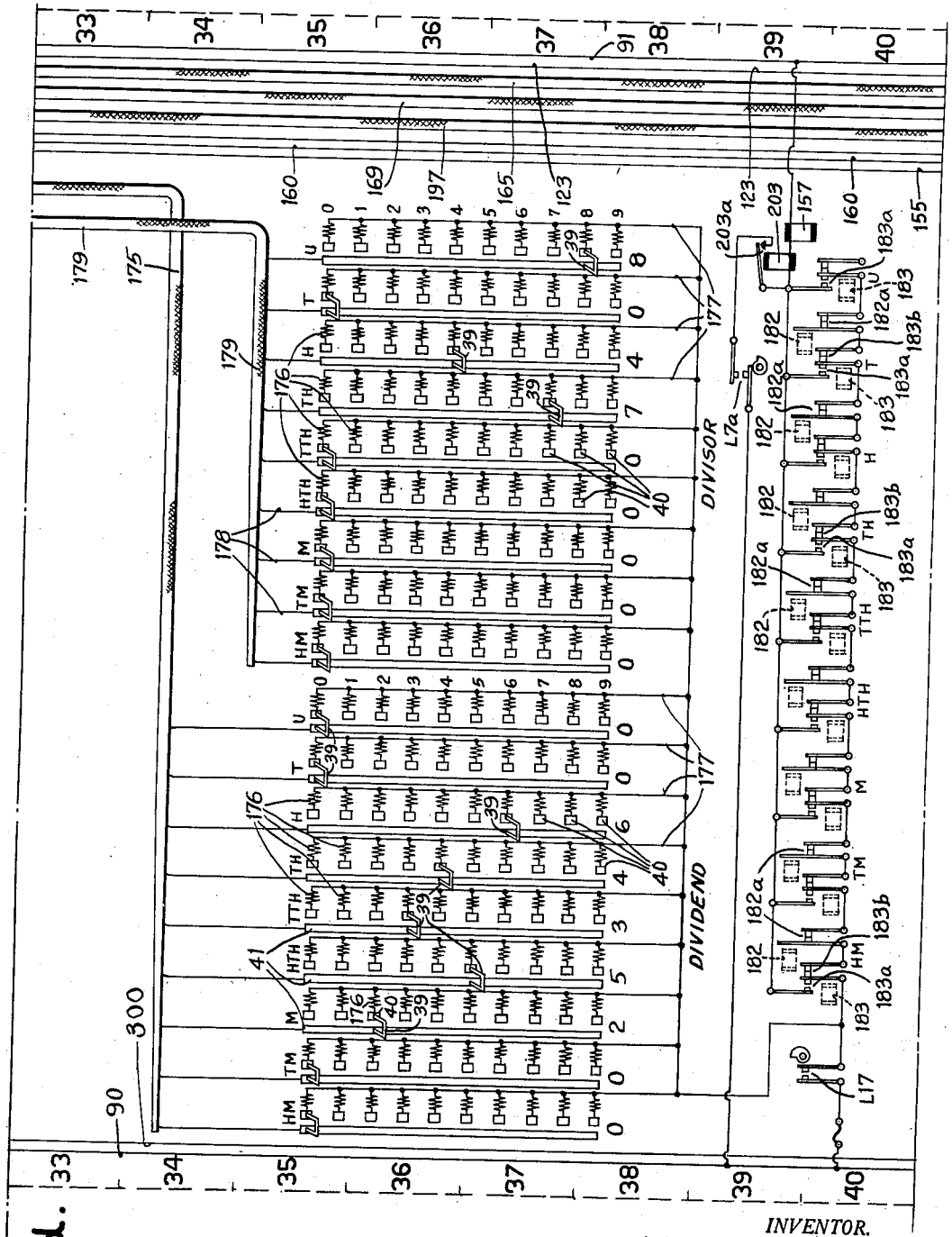

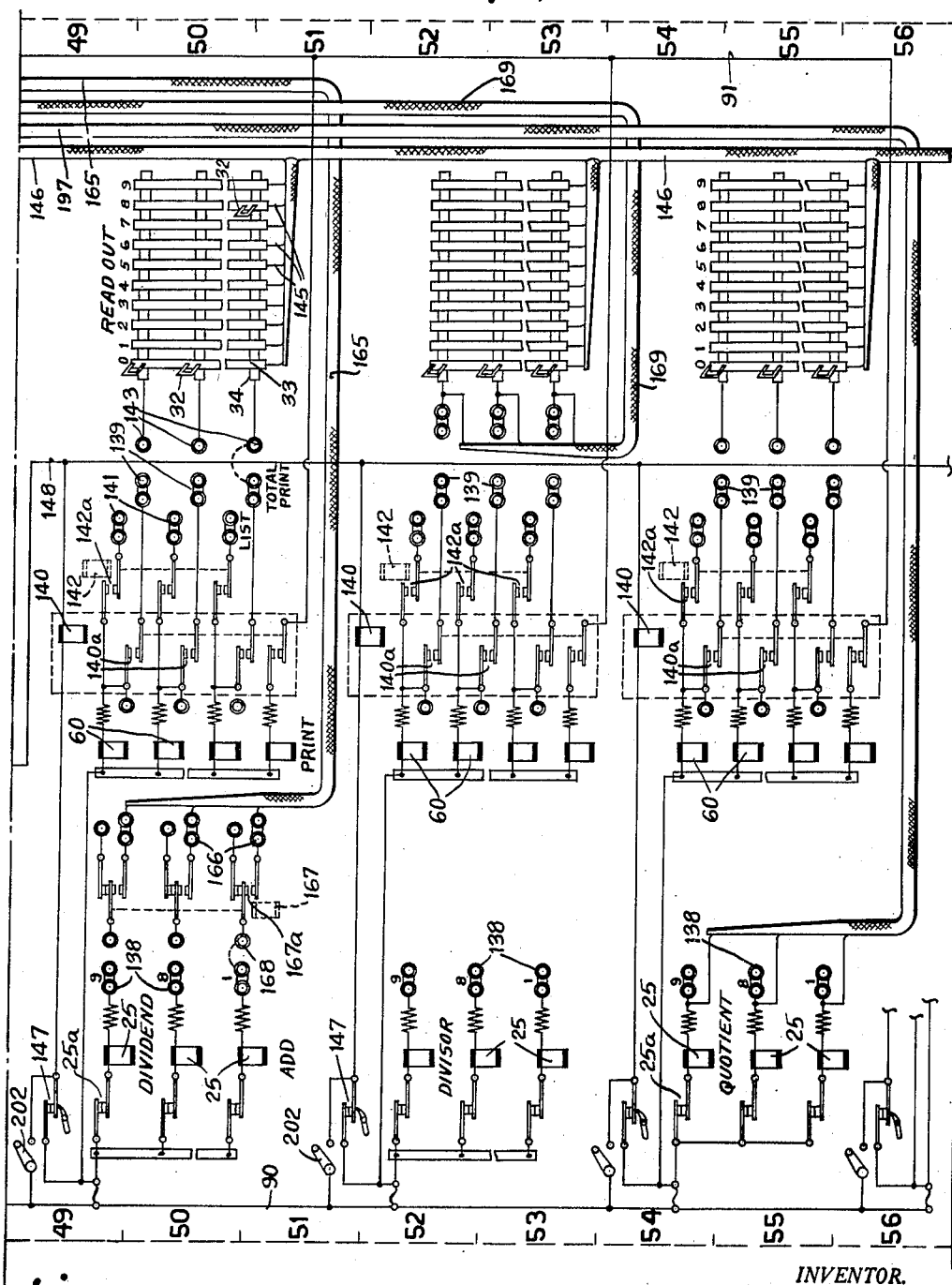

Patented Apr. 1, 1941

2,237,150

UNITED STATES PATENT OFFICE 2,237,150

DIVIDING MACHINE

Ulrich M. W. Kölm, Berlin-Lankwitz, Germany, assignor to International Business Machines Corporation, New York, N. Y., a corporation of New York Application May 18, 1935, Serial No. 22,202
In Germany July 6, 1934

9 Claims. (Cl. 235—61.6)

This invention relates to improvements in dividing machines and more particularly to machines of the record card controlled type. With previous machines of this class, the dividend and divisor are first entered into the machine. Thereafter, subtraction is started, the divisor being subtracted from the dividend, beginning the subtraction in the highest possible orders of the dividend. Subtraction continues in that order until the result of the dividend passes through zero or goes back of zero. Then the customary procedure is to add back the divisor once into the dividend accumulator. Thereafter, the divisor is shifted over one place relatively to the right and the above subtraction operation is repeated. A quotient counter is customarily provided to keep count of the number of substracting operations in each denominational order and this subtracting counter also subtracts one when the divisor amount is reintroduced into the dividend accumulator. This process proceeds for the various denominational orders of the dividend until the capacity of the machine is reached or until as many places are set up in the quotient counter as are desired. If an amount then remains in the dividend accumulator, this is the remainder.

Various proposals have been made to shorten these operations but none of them materially speeds up the operation. According to the present invention, it is proposed to obviate the so-called "going back to zero" operation by providing comparing mechanism which effects a comparison between the dividend and the divisor and anticipates the subtracting operation which would, if permitted to take place, cause the dividend to become less than zero or "go back of zero."

The comparing mechanism in addition to effecting the above operations also controls and effects a column shift operation so that on the next ensuing subtracting operation the divisor is subtracted from different denominational orders of the dividend.

The principal object of the invention, therefore, is to provide division mechanism employing the successive substraction method of computation wherein the number of subtracting operations is equal to the sum of the digits in the quotient.

According to another object of the invention, the dividend and/or the divisor may represent totals accumulated in response to the analysis of a plurality of record cards so that the quotient resulting from the division of one total by the other will represent an average. Thus, if the dividend total represents, let us say, price, and the divisor represents quantity, the quotient will represent the average unit price. The comparing mechanism includes devices for comparing the setting of the divisor accumulator with each successive setting of the dividend accumulator as the divisor is repeatedly subtracted therefrom. Provision is made for automatically interrupting further substracting operations after the division has been carried out to a predetermined degree of accuracy, after which the quotient may be automatically recorded and the several accumulators reset preparatory to receiving the factors of a further computation.

Various other objects and advantages of the invention will be obvious from the following particular description of one form of mechanism embodying the invention or from an inspection of the accompanying drawings; and the invention also constituted certain new and useful features of construction and combination of parts hereinafter set forth and claimed.

In the drawings:

Fig. 3 is a central section of an accumulator showing the type of readout mechanism associated therewith.

Fig. 4 is an isometric view showing the so-called "highest order carry mechanism" whereby an entry of "1" may be made into the units order under control of the highest order.

Fig. 5 is a central section of the printing mechanism showing the driving instrumentalities.

Fig. 7 is a diagrammatic representation of the steps involved in the solution of a particular problem.

Figs. 8, 8a, 8b, 8c, 8d, 8e, and 8f, taken together and placed one below the other in the order named, constitute a wiring diagram of the electric circuits of the machine.

Fig. 9 is a timing chart of the electric circuit controlling devices of the machine.

General description

The several units of the machine will first be described in sufficient detail for an understanding of their construction and their manner of operation. Following this, the circuit diagram will be explained and the complete operation of the machine set forth.

The mechanical structure of the machine is substantially similar to that shown in Patent No. 1,762,145, issued to G. F. Daly and R. E. Page on June 10, 1930; Patent No. 1,916,986, issued to R. E. Page and C. D. Lake on July 4, 1933; Patent No. 1,921,454, issued to G. F. Daly on August 8, 1933, and also in Patent No. 1,976,617, issued to C. D. Lake and G. F. Daly on October 9, 1934. Only sufficient structure will therefore be herein described to point out wherein departure has been made from previous arrangements. The main operating circuits and the electrical wiring arrangement are substantially the same as disclosed in my copending application, Serial No. 729,385, filed June 7, 1934, now Patent No. 2,131,226, issued Sept. 27, 1938, and the operating circuits in the present case will, therefore, be described in only so much detail as is necessary for an understanding of the present invention.

*Card feeding mechanism*

Figure 1:
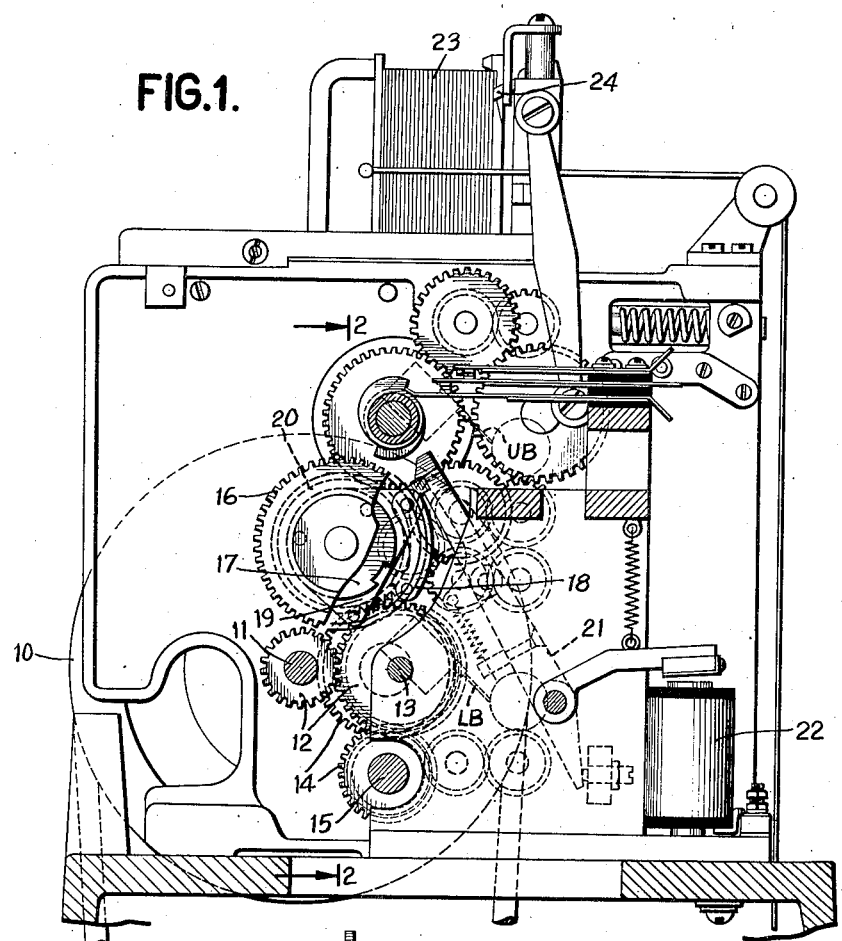
Fig. 1 is a section of the card feeding and analyzing mechanism showing the coupling connection therefor.
Figure 2:
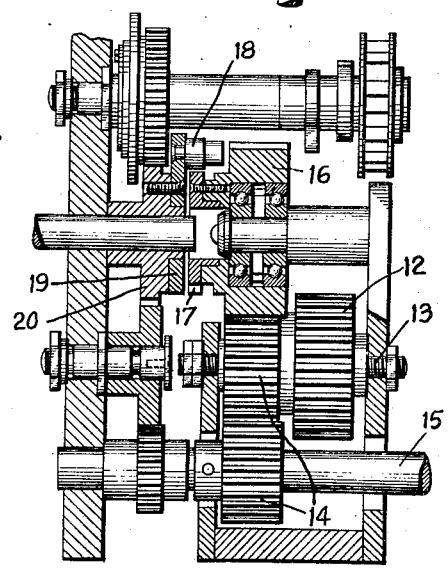
Fig. 2 is a detail in section taken substantially along lines 2—2 of Fig. 1.

The card feeding mechanism and its declutching device are shown in Figs. 1 and 2 where the pulley 10 driven from the main driving motor of the machine has driving connection with shaft 11, which, through gears 12, drives a shaft 13. The latter in turn, through gears 14, engages a gear 16 (Fig. 2) to which is secured a clutch driving element 17. Adapted to cooperate with element 17 is a spring-pressed dog 18 carried by a member 19 integral with a gear 20, which latter has connection to the usual train of gears which serve to convey the record cards through the analyzing devices. The dog 18 is normally held out of engagement with element 17 by a clutch releasing arm 21, which, upon energization of magnet 22, is rocked in a clockwise direction to release dog 18 for engagement with element 17 so that the card feeding mechanism may operate.

During the operation of the feeding mechanism the cards are fed singly from a stack 23 by means of a picker 24 to suitable rollers which convey the cards past upper analyzing brushes UB and lower analyzing brushes LB. The brushes are so spaced that a record card feeds past the lower analyzing brushes LB exactly one machine cycle after the card has passed beneath the upper analyzing brushes UB. It will be apparent that card feeding operations only take place when magnet 22 is energized to permit coupling of the card feeding mechanism to the driving mechanism.

*Accumulators*

As the perforated cards pass the lower brushes LB, perforations in their index point positions permit instantaneous closure of circuits through the proper lower analyzing brushes LB to energize accumulator magnets 25 (Fig. 3). As usual, the timed energizations of these magnets control mechanism for entering the data corresponding to the card reading on the wheels 26. The wheels 26 are driven from a clutch shaft 27 to which a gear 28 is coupled upon energization of magnet 25. Gear 28 has driving connection with wheel 26 through a gear 29 fast upon the wheel.

*Readout mechanism.*—Also driven by gear 28 is a gear 30 which is displaced along with gear 29. Since the ratio of gears 30 and 29 is 2:1, the former will turn through a half revolution for each revolution of the latter. Carried by and insulated from gear 30 are two brush structures 31 and 32 (see Fig. 6) one structure being on each side of the face of gear 30. The brush structure 32 comprises a pair of electrically connected contacting brushes, one of which cooperates successively with ten conducting segments 33, while the other cooperates with an arcuate conducting strip 34.

The brush structure 31 also carries a pair of electrically connected brushes, one of which cooperates with an arcuate strip 35, while the other cooperates with a single conducting segment 36. The relationship of the parts is such that when the index wheel 26 is in its zero position, one of the brushes of structure 32 is in contact with the zero segment 33 and the other brush is in contact with the strip 34. One of the brushes of structure 31 will be in contact with the segment 36 which is in line with the zero segment 33 to form an electrical connection between segment 36 and the strip 35.

Each gear 30, through an idler 37, drives a gear 38. This gear also carries a brush structure 39, one of whose brushes cooperates successively with ten conducting segments 40 while the other cooperates with an arcuate conducting strip 41.

If the wheel 26 is displaced to indicate, say, 8, then one of of the brushes of structure 32 will be in contact with "8" segment 33 and one of the brushes of structure 39 will be in contact with the "8" segment 40, thus connecting these segments with their respective conducting strips 34 and 41. The brushes of structure 31 form no electrical connection except when the associated wheel 26 registers zero.

The positioning of the several brush structures provides a convenient electrical readout mechanism for controlling the total printing operations, transferring operations, and comparing operations, and the electrical circuits involved in these different functions will be more fully explained in connection with the circuit diagram.

Figure 6:
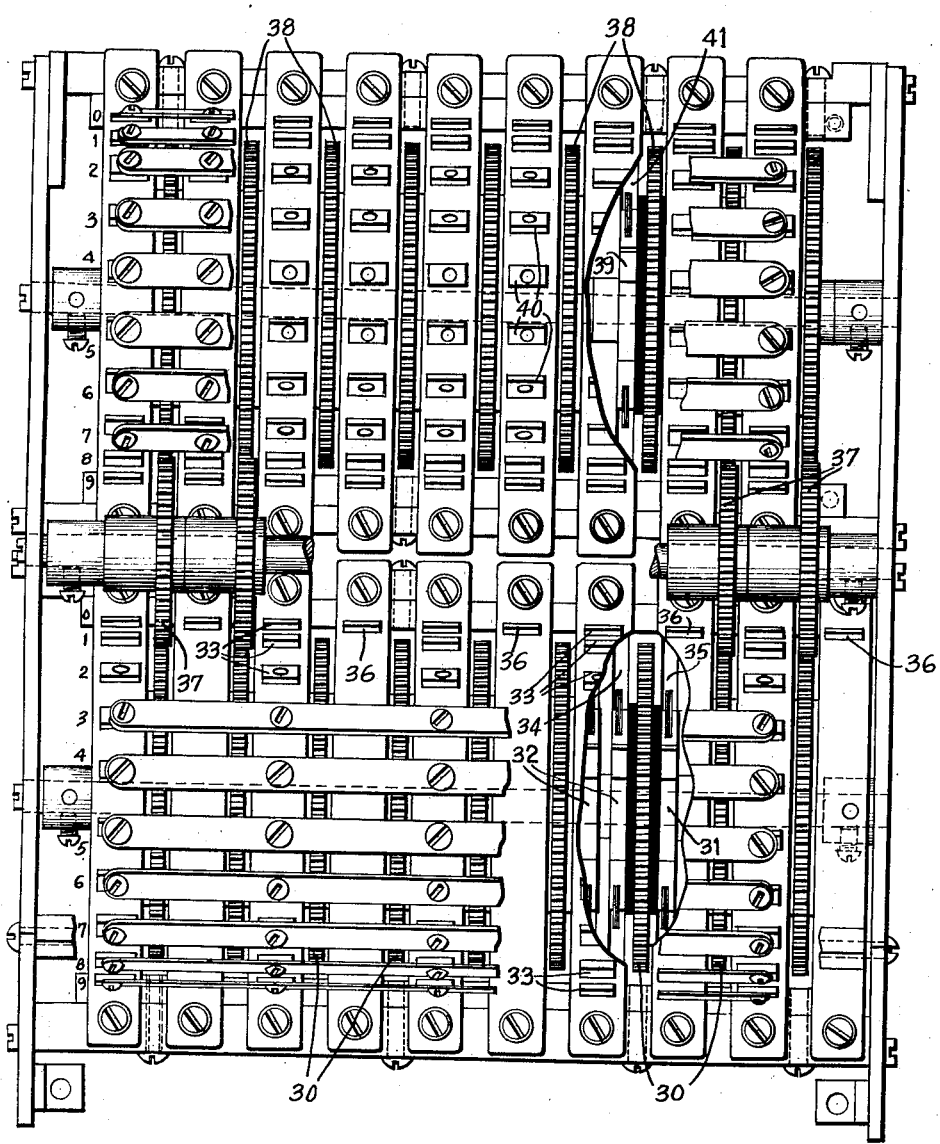
Fig. 6 is a plan view of the readout mechanism of one of the accumulators.

The complete commutator mechanism, just described and as shown in Fig. 6, need only be provided for the accumulators which receive the dividend and the divisor. For the accumulator which receives the quotient, only the devices directly associated with gear 30 and brush structure 32 are required.

Associated with each accumulator wheel is the usual carry lever 42 (Fig. 3) which controls carrying from its order to the next higher order. As any wheel passes from nine to zero, its lever 42 is rocked slightly clockwise and thereby conditions the next higher order to receive an additional unit during the carrying period of the machine cycle.

*Highest order carry mechanism.*—In Fig. 4 there is shown mechanism for connecting the highest order carry lever 42 with the lowest or units order carry lever in such manner that when the highest order wheel 26 passes from nine to zero, the lowest order lever 42 will be rocked slightly clockwise and an additional unit will consequently be entered into such order. This mechanism comprises a lever 43 having an adjustable arm 44 at one end disposed in the path of the highest order lever 42. The opposite end of lever 43 has connection with an arm of a member 45, the other of whose arms engages an angle 46 secured to the units carry lever 42 so that as the arm 44 moves downwardly, the angle 46 will be moved in the same direction to also draw the units lever 42 down. This carry lever controlling mechanism is contained in the dividend accumulator and functions during subtracting operations of the machine as will be further explained hereinafter.

Printing mechanism

The printing mechanism is shown in Fig. 5 and is similar to that shown in the patents mentioned above. The type bar 47 is positioned relatively to the platen 48 to bring the proper type 49 into printing position opposite the platen. The "total" shaft 50 driven by the reset motor RM is provided with a cam 51 cooperating with a roller 52 carried on arm 53 which is freely rotatable on shaft 54. As the cam rotates, arm 53 rocks clockwise and a lug 55 on arm 53 cooperating with a double-armed member 56 fixed to shaft 54 also rocks the member clockwise. Arm 57 secured to shaft 54 is linked to printing crosshead 58 which serves to raise the type bar 47 in synchronism with the total taking operation so that the type 49 successively pass printing position opposite the platen 48. Owing to spring-operated scissors connections 59, however, the type bars 47 may be arrested at any printing position without interfering with the upward movement of the crosshead 58. The type bars are arrested under control of the printing magnets 60. When any such magnet is energized, it attracts its armature 61 and pulls a call wire 62 toward the right, thereby releasing a latch member 63 normally holding a stop pawl 64. When the pawl 64 is so released, it is spring-operated to engage ratchet teeth 65 formed on the type bar 47, to prevent further upward movement of the bar and thus hold a particular type in printing position.

During listing operations, shaft 54 is rocked to reciprocate printing crosshead 58 under control of listing cam 66 carried by list shaft 67 which is operated from the motor TM through shaft 15 (Fig. 1) in the usual manner during listing and card feeding operations.

Cam 66 is provided with a cam slot which cooperates with follower roller 68 carried by an arm 69 loosely mounted on shaft 54. A lug 70 on arm 69 cooperates with double-armed member 56 to rock shaft 54. The configuration of the cam groove is such that the type bars are elevated and the type 49 moved past printing position in synchronism with the passage of the corresponding index point positions in the record cards past the analyzing brushes. The cam 66 is freely mounted on shaft 67 and may be coupled thereto under control of a magnet 71 which upon energization will rock its armature 72 which in turn, through an extension 73, will rock an arm 74 carried by a rod 75. Rod 75 also carries an arm 76 whose free end is adapted to engage the pin 77 in clutch releasing arm 78 which normally engages a spring-pressed dog 79 carried by the cam 66. Rocking of arm 78 under the influence of magnet 71 will free dog 79 for engagement with clutch driving element 80 secured upon shaft 67 so that the cam 66 will move with the shaft. Magnet 71 is energized whenever listing operations are to be performed. The cam 66 is adapted to cooperate with a roller 81 in arm 82 which is freely mounted on the supporting rod of arm 78 and will rock the arm clockwise to cause opening of a pair of contacts 83 whose function will be explained in connection with the circuit diagram.

The adding and printing mechanisms just described are well known in the art and only sufficient thereof has been explained for an understanding of the present invention.

Wiring diagram—Operating circuits

The various mechanical devices employed in the present invention have now been explained to show their manner of operation.

The wiring diagram, which is about to be explained, will serve to show how the several elements are coordinated in the operation of the machine. The electric circuits are shown in Figs. 8, 8a, 8b, 8c, 8d, 8e, and 8f, which, taken together and placed one below the other in the order named, constitute a complete wiring diagram of the electric circuits of the machine.

In the circuit diagram, relay magnets and their associated contacts have generally been shown in close proximity to one another and the related contacts have been designated with the same reference character as the controlling magnet with a lower case letter suffixed thereto. In certain instances, where it would add to the complexity of the circuit connections to show the relay magnets and their contacts together, the magnet has been shown in dotted outline adjacent to the contacts which it controls.

The various cam controlled contacts as shown in the drawings are suitably labelled to indicate the units with which they are associated. Thus, cam contacts prefixed L and SL function when the tabulating and listing mechanisms operate, and those which operate only during total taking operations are prefixed with the letter P or SP. In order to facilitate the location of the various electrical devices on the circuit diagram, vertical broken lines are drawn at the sides thereof with spaced graduations, the spaces between which are serially numbered. In the following description, the various elements will be located with reference to these numerals. For example, a cam contact such as P1 will be designated as being located at (L2) on the circuit diagram. The designation (L2) is interpreted as left of section 2. Elements in the center of the drawing will be designated (C) for center, followed by the appropriate numeral, and elements at the right will be designated as (R).

*Initial resetting circuit.*—As is customary in tabulating machines of this type, an initial resetting cycle of operations is usually performed to insure that all accumulators are zeroized and to prepare the usual automatic group control mechanism for proper functioning. Referring now to Fig. 8, after the main line switch has been closed, current will be supplied to left side of line 90 and right side of line 91. Depression of the reset key at this time will close contacts 92 (C3) to establish a circuit traceable as follows: from left side of line 90, cam contacts L5 (L4), contacts P3, reset clutch magnet 93, relay magnet 94, reset key contacts 92, switch S3b (closed for this operation), contacts 97a, to line 91. The relay 94 closes its contacts 94a to complete the circuit through the reset motor RM. This circuit follows from line 90, contacts L5, motor RM, contacts 94a, to line 91, and the total shaft 50 consequently commences rotation, during which rotation cam contacts P4 (R4) are closed to short circuit the contacts 94a and maintain the motor circuit throughout the cycle.

Later in the cycle, contacts P3 (L4) open to interrupt the reset clutch magnet circuit. Also during this cycle, the operation of cam contacts P5, P6, and P7 (L7, L8) sets up the automatic control circuits which will be more fully explained later. The setting up of these circuits will effect energization of the so-called motor control relay magnet 97 (L8) to cause opening of contacts 97a (R3) and closure of contacts 97b. These contacts will thereafter remain in their shifted position until the group control mechanism detects a change in group control designations of successively analyzed record cards.

The machine may now commence card feeding operations and these may be initiated by depressing the start key to close contacts 98 (C2) whereupon a circuit will be completed as follows: from left side of line 90, cam contacts P1 (L2), main drive clutch magnet 99, contacts 99a, relay coil 95, a pair of stop key contacts 101, start key contacts 98, a second pair of stop key contacts 102, contacts 97b, now closed, to line 91. Energization of clutch magnet 99 will cause opening of the related contacts 99a and consequently relay magnet 104 will be included in the circuit. This relay will close its contacts 104a (C2) thereby completing a circuit through the tabulating motor TM. The energization of clutch magnet 99 will cause operation of the accumulating mechanism and energization of the printing clutch magnet 71 (L3) will cause accompanying operation of the printing mechanism.

*Printing clutch circuit.*—The circuit for magnet 71 is traceable from line 90, magnet 71 (L3), relay contacts 105a, closed when the machine is set for listing operations, contacts 97c, closed during the initial resetting cycle by magnet 97, to line 91. With the magnet 71 energized, printing operations will take place during each cycle of operations of the machine.

The contacts 105a are controlled by relay magnet 105 (R1) which is energized upon manual closure of contacts 106. These contacts are closed when the machine is conditioned for listing and consequently, magnet 105 will remain energized throughout such operations.

Relay magnet 95 (C2), energized upon completion of the circuit through clutch magnet 99, will close its contacts 95a to transfer the circuit through the clutch magnet to the control of cam contacts L2 which hold the circuit throughout the cycle. A second pair of contacts 95c (L1) are closed by the relay to complete a circuit, under control of cam contacts L1, to a relay 107. This relay will close its contacts 107a and open its contacts 107b and thereby serves to control the speed of the motor TM. Contacts 107b, when closed, short circuit a resistance 108 in the field circuit of the motor TM and opening of these contacts will include the resistance in the field circuit so that the speed of the motor will be thereby increased. A second pair of contacts 105b (R1) also short circuits resistance 108 and these contacts are closed along with contacts 105a when the machine is set for listing. Contacts 83, in series with 105b, close mechanically when the printing clutch is engaged and open when it is disengaged. This serves to cause high speed operation during transfer cycles, during which there are no printing operations.

*Card lever circuits.*—As the record cards feed downwardly past the analyzing brushes UB, the upper card lever contacts 109 (R7) close to energize relay magnet UCL whose contacts UCLa form a holding circuit through cam contacts L13. Another pair of contacts UCLb (C2) in the circuit of clutch magnet 99 short circuits cam contacts L2 and L3 to maintain the motor circuit for a period when these cam contacts are open during the cycle.

As the card passes the lower analyzing brushes LB, lower card lever contacts 110 (R8) are closed to energize lower card lever relay LCL whose contacts LCLa provide a holding circuit through cam contacts L14. Relay LCL controls several contacts which will be explained in connection with the circuits which they control.

*Card feed clutch circuit.*—For card feeding operations, the switch S3a (L3) is in its full line position and the circuit completed from line 90, through card feed clutch magnet 22 (L3), switch S3a, to line 91. The magnet 22 will therefore remain energized throughout all machine operations and the card feeding mechanism will operate accordingly.

Under control of the circuits thus far described the machine will operate to feed cards successively through the analyzing mechanism and circuits will be completed through perforations in the records for controlling the operation of the accumulating and printing magnets. The detailed tracing of the accumulating and printing circuits will be deferred until later in the description. During the feeding of cards, the automatic group control mechanism, generally designated GC at (C7) functions to keep the machine running as long as successive cards contain the same group control number.

Upon detection by this mechanism of a change in group control designation, the relay magnet 97 (L8) will become deenergized causing opening of the related contacts 97b (R3) to interrupt the circuit through main clutch magnet 99, which in turn will break the circuit to the motor TM and card feeding and accumulating operations will thereupon cease.

*Automatic resetting circuits.*—If switch S2 (R4) is closed, the closure of cam contacts L4 (R4) toward the end of the last adding cycle when contacts 97a are closed will complete a circuit to initiate automatic resetting operations. This circuit is traceable from line 90, contacts L5, P3 (L4), reset clutch magnet 93, relay magnet 94, switch S2, contacts L4, switch S3b, contacts 97a, to line 91. Energization of magnet 93 will cause a resetting cycle of operations of the machine during which the amounts standing in the accumulators will be printed and the group control devices again set up to open contacts 97a.

When the machine is to perform division, the switch S3b is opened after the initial resetting cycle and the subsequent automatic initiation of resetting is effected through relay contacts 85a, which short circuit the switch S3b. The controlling coil 85 of contacts 85a is energized upon the completion of dividing operations in a manner to be explained.

*Automatic restarting circuit.*—Following the reset cycle, the machine may automatically enter upon card feeding and analyzing operations if switch S1 (C3) is closed. Under such conditions, the closure of cam contacts P2 (R3) near the end of the reset cycle will complete the circuit into the main clutch magnet 99 through the following path: from line 90, contacts P1 (L2), magnets 99, 104, and 95, stop key contacts 101, switch S1, contacts P2, contacts LCLc (closed if there is a card at the lower brushes), contacts 97b, to line 91. The energization of magnet 99 will, as explained above, cause the machine to enter upon a tabulating cycle of operations during which the succeeding record cards are analyzed and the data thereon entered into the recording devices.

*Automatic control circuits.*—The automatic group control circuits which keep the machine in operation as long as classification data on successively analyzed cards are the same, will now be explained in as much detail as is necessary for an understanding of the present invention. A number of double-wound relay magnets is provided, each magnet having a pick-up winding 112 (R6) and a holding winding 113, shown separately in Fig. 8. Windings 112 terminate in the plugboard sockets 114 and 115, through which the windings may be plug connected in series with the brushes UB and LB. Since the index point positions on the card passing the lower brushes are analyzed concurrently with the analysis of the corresponding index point positions of the following card passing the upper brushes, a perforation occurring in any index point position on both cards will complete a circuit at a time in the cycle of the machine corresponding to the location of the perforation. This circuit is traceable as follows: from line 90, through wire 116 (L8), cam contacts L7, upper brush contact roller, brush UB, plug socket 117, plug connection 118, to socket 114, winding 112, socket 115, plug connection 119 to lower brush socket 120 (R47), lower brush LB, wire 121, impulse distributor 122 (R42), wire 123 (Figs. 8e, 8d, 8c, 8b, 8a and 8), lower card lever relay contacts LCLc (R2), contacts 97b, to line 91. Energization of winding 112 will close its related contacts 112a (R6) and 112b (C6, C7), the former setting up a holding circuit for the winding 113 through cam contacts L11 (R7).

After all the index point positions have been analyzed, the machine tests the setting of the contacts 112b. If there was agreement in all the control columns, the contacts 112b corresponding to those columns will be closed and a series circuit will be traceable through each such contacts.

The automatic group control mechanism is arranged for so-called minor, intermediate, and major group controlling. For the purposes of the present invention, however, it will be sufficient to describe but one of these stages of control, for example, the minor stage. The contacts associated with the so-called minor controlling field of the record card will be grouped together and a connection 124 (C8) made between the plug socket 125 of the last position and minor plug socket 126. This places the first two contacts 112b in the minor holding circuit. The ultimate object of the group control mechanism is to keep the motor control relay 97 energized if there is agreement in the control fields and to cause deenergization of magnet 97 if there is a break or disagreement in a field.

*Minor holding circuit.*—Magnet 97 is normally held energized through a circuit set up during the initial reset cycle of the machine. During this cycle, cam contacts P7 close, completing a circuit from line 90, relay contacts 103b, which remain closed if the machine is set for minor controlling only, contacts P7 (L8), magnet 97, contacts L8, switches S7, S6, contacts UCLc, wire 131, to line 91. Magnet 97 closes a pair of contacts 97d (L8) to establish a holding circuit through the magnet. This circuit is called the minor holding circuit and remains established as long as minor classification data on the record cards do not change.

*Minor shunt circuit.*—During tabulating and listing cycles of the machine, the contacts 112b provide a shunt circuit around cam contacts L8, the short circuit running from the lower blade of contacts L8 to the lowermost contacts 112b, then to the upper blade of the second pair, plug connection 124, switches S7, S6, to line 91. The switches S6 and S7 are closed when intermediate and major controlling operations are not employed.

As more fully explained in my copending application, when the machine is arranged for intermediate and major controlling, the relay magnet 103 (L7) is deenergized upon an intermediate group change and the relay magnet 132 (L6) is deenergized upon a major group change.

Thus far, the operation of the machine is substantially the same as that of my copending application and as of the type disclosed in the patents referred to; that is, groups of record cards are successively fed past the brushes UB and LB and information therefrom entered into accumulators. After a complete group has been analyzed, the magnet 97 is deenergized. If the groups comprise each but a single card, the magnet 97 will be deenergized after each card feeding operation. In normal tabulating machines, the deenergization of magnet 97 is usually followed by the so-called total taking cycle of operations during which the totals standing in the various accumulators are printed and the accumulators zeroized or not as desired. In the present invention this total taking and resetting cycle of operations is delayed until the operations of division have been performed. The manner in which the transferring operations which take place to effect dividing are initiated and carried out will now be explained.

*Dividing cycle controlling circuits*

Referring now to Fig. 8, the switch S3a (L3) is moved to its dotted line position when dividing operations are to be performed. In this position, the card feed clutch magnet 22 is connected in series with pairs of relay contacts 85c and 97e.

The opening of contacts 97e upon a group change will deenergize the card feed clutch magnet 22 and the machine will perform dividing cycles without accompanying card feeding. The contacts 85c are closed during a dividing cycle in a manner to be explained and during a following reset cycle, contacts 97e are also closed. This sets up a circuit for relay magnet 137 (L3) which follows from line 90, relay magnet 137 (L3), contacts 85c, 97e, to line 91. Relay 137 closes its contacts 137a which provide a holding circuit for the relay and at the same time short circuit contacts 85c so that they may thereafter open. In this manner, a circuit is provided for the card feed clutch magnet 22 which is maintained until the group control mechanism again causes opening of contacts 97e. Switch S3c is also moved to its closed position to provide a holding circuit for the main drive clutch magnet 99 after card feeding operations have been interrupted. This circuit is traceable from line 91, through switch S3c (R2), normally closed contacts 85b, contacts L3, 95a, magnets 95, 104, and 99, contacts P1, to line 90. At the completion of the dividing cycles of operation, contacts 85b open to interrupt the circuit. Switch S3b (R3) is open for dividing operations so that automatic reset operations do not take place when the minor control relay contacts 97a close.

The machine will thus, upon a group change, perform a succession of cycles of operation without accompanying card feeding or printing and as the machine is arranged, these extra cycles will be equal in number to the sum of the digits in the quotient to be computed.

Adding and printing circuits

The adding magnets 25 (L49-56) are wired to plug sockets 138 from which plug connection may be made to the lower brush sockets 120 (R47). A representative adding circuit may be traced therethrough as follows: from line 90, contacts 25a (L49), adding magnet 25, plug socket 138, connection to socket 120 (R47), lower brush LB, wire 121, distributor 122, wire 123, contacts LCLc, contacts 97b, to line 91.

The print magnets 60 (C49-56) are wired to plug sockets 141 through relay contacts 142a which are adapted to be closed during listing operations. A plug connection is made between sockets 141 and lower brush sockets 120 in positions in which printing is to be effected. The printing circuit may then be traced from lower brush LB (R47), socket 120, connection to socket 141 (C49), contacts 142a, print magnet 60, to line 90. In this manner, the adding magnet 25 and the corresponding printing magnet 60 are concurrently energized through the circuits traced and the number represented by the location of the perforation will be entered into the adding mechanism and printed under control of the printing mechanism.

The relay magnets 142 are shown at L48 and each is provided with a switch 200 by means of which it may be connected to list switch 201 (closed for listing operations) and cam contacts L19 (L47). Cam contacts L19 are closed during the card reading portion of the cycle and complete a circuit from line 90, contacts L19, 201, switch 200, relay magnet 142, wire 144 to line 91. The contacts 142a (C49) are accordingly closed for the corresponding period and open at other times.

*Total printing circuits.*—During total taking operations the printing magnets 60 are connected to plug sockets 139 through relay contacts 140a which are closed during total taking operations in a manner to be set forth. The sockets 139 may be connected to sockets 143 of the accumulator readout mechanism. During the total taking cycle, circuits will be completed through the readout devices of the accumulator at differential times according to the position of the brush structures 32 through circuits of which the following is representative: from line 91, wire 144 (R41), cam contacts SP12 (C45), switch S11, a series of cam contacts SP1-SP9 which close in succession to emit impulses to wires 145. These wires extend through cable 146 and terminate at the readout segments 33. Assuming now that a contact structure 32 is positioned to represent "8," the total printing circuit will follow through the SP8 contact timed to close at the "8" time in the cycle and thence through the "8" wire 145 to the "8" bar 33 (R50), thence through structure 32 to bar 34, plug socket 143, connection to socket 139, contacts 140a, print magnet 60, to line 90.

The relay contacts 140a are controlled by a relay magnet 140 (C49) which is energized through a circuit from line 90, through switch 202 or contacts 147 closed by the resetting mechanism, magnet 140, wire 148, contacts SP12 (C45), wire 144, to line 91.

In Fig. 8a are shown the commutator segments 36 and cooperating brush structures 31. In those positions of the dividend and divisor in which zeros occur, the brush structure 31 will be in contact with the corresponding commutator segments 36 and circuits will be completed through associated relay magnets 151 and 152.

The circuits through magnet 151 are traceable from line 90, switch S5a (L9), commutator K1 and cooperating brushes 154, wire 155, relay contacts 97f (C42), cam contacts P9, to line 91. Magnets 152 are energized through a circuit extending from line 90, switch S5a (L9), magnets 152, commutator segments 36 of the divisor accumulator brush structure 31, wire 155, to line 91 as before. Thus, upon the closure of contacts 97f, which takes place upon a group change, the relay magnets 151 and 152 are energized in accordance with the location of zeros in the divisor and dividend.

The operation of the machine may best be explained from this point in connection with a specific problem; for example, that shown in Fig. 7 in which a dividend 25346 is to be divided by 7408. The dividend amount is entered into the orders of the dividend accumulator with the units digit 6 entered in the third or hundreds position, thus providing for the computation of a total extending to two decimal places. The divisor is entered into the units, tens, hundreds, and thousands orders of the divisor accumulator. Thus, in the dividend accumulator, there will be zeros in the units, tens, tens of millions, and hundred of millions positions and zeros will appear in the divisor accumulator in the five highest order positions where each accumulator is composed of nine positions.

Energization of relay magnet 151 (L10) will cause closure of its contacts 151a (C10) and opening of its contacts 151b whereupon, for the dividend amount chosen in which the two highest order relay magnets 151 are energized, a circuit is traceable from line 90, switch S5a, wire 256, relay magnet VR16, normally closed relay contacts 157b, contacts 151b associated with the millions order relay 151, contacts 151a in the tens of millions order (now closed), contacts 151a in the hundreds of millions order, brushes 158 of commutator K3, wire 160, relay contacts 97g (R22), to wire 91.

Magnet VR16 closes its contacts VR16c to provide a holding circuit extending from line 90, switch S5a, wire 256, magnet VR16, contacts VR16c, brushes 153 of commutator K2, wires 161, 155 to line 91 as before.

For the problem under consideration, the five highest order divisor magnets 152 will be energized causing closure of their relay contacts 152b (R11) and opening of the companion contacts 152c. A circuit is thereupon traceable from line 90, switch S5a, relay magnet VR4, normally closed contacts 152c in the thousands order and thence serially through the now closed relay contacts 152b in the five higher orders, cam contacts L18, wires 161, 155, to line 91, as before.

The relay VR16 has selected the highest significant figure position of the dividend for comparison with the highest significant figure position of the divisor as selected by the relay magnet VR4. The highest order figure of the dividend according to the example of Fig. 7 is "2" while the highest order figure of the divisor is "7". A further function of the relays VR16 and VR4 is to associate the readout mechanism of the divisor accumulator with the entering circuits of the dividend accumulator so that the four positions of the divisor will be connected for entry into the four highest orders of the dividend. The actual transfer will take place as an addition of the complement of the divisor to the dividend.

Inspection of the problem will show, however, that the selected divisor cannot be properly subtracted from the four highest orders of the dividend since the "7" is greater than the "2."

The comparing mechanism will detect this difference in the manner to be presently explained and cause a shifting of the connections between the divisor and dividend accumulators so that the subtraction of the divisor will occur from the next lower positions of the dividend.

Figure 8B:
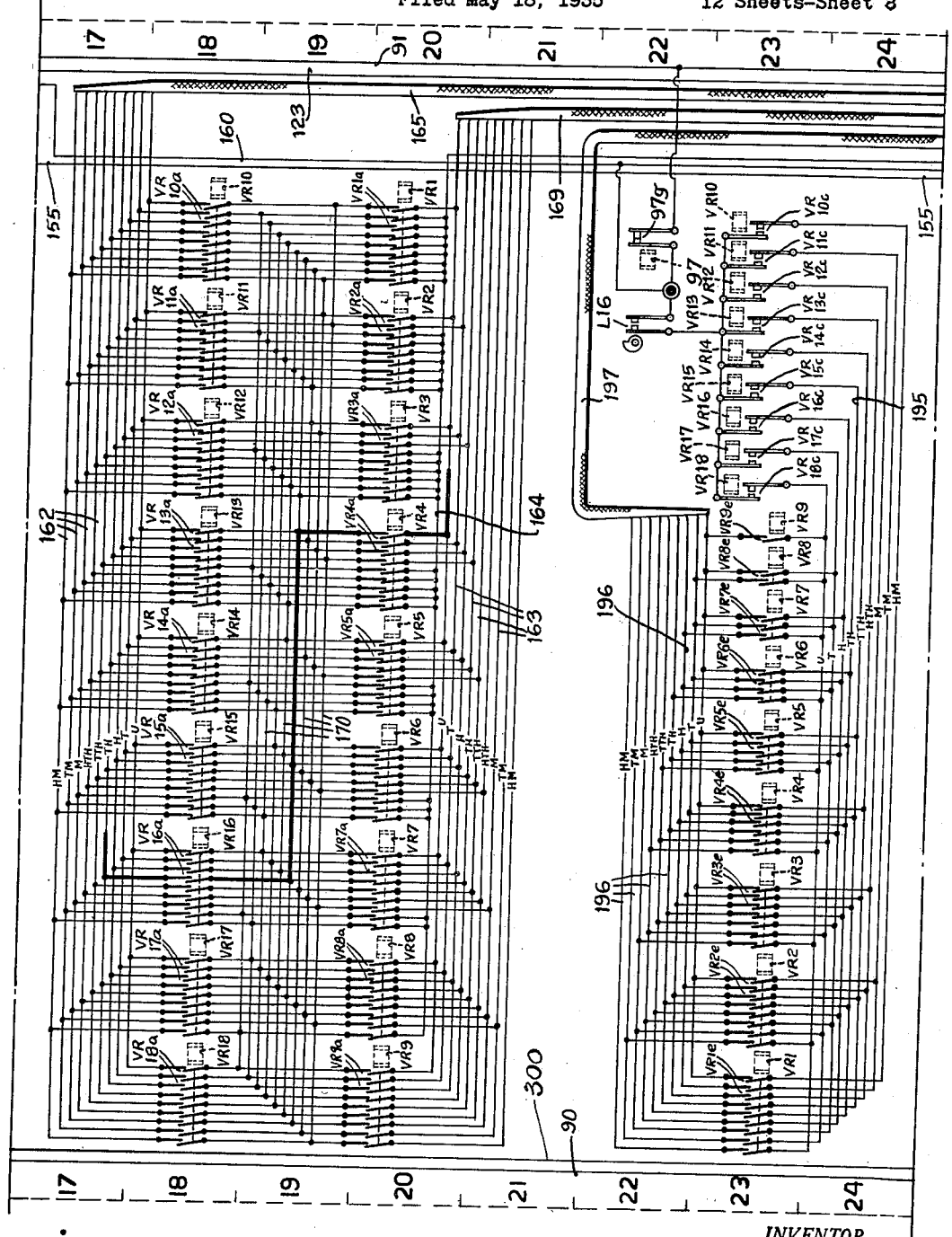
Figure 8E:
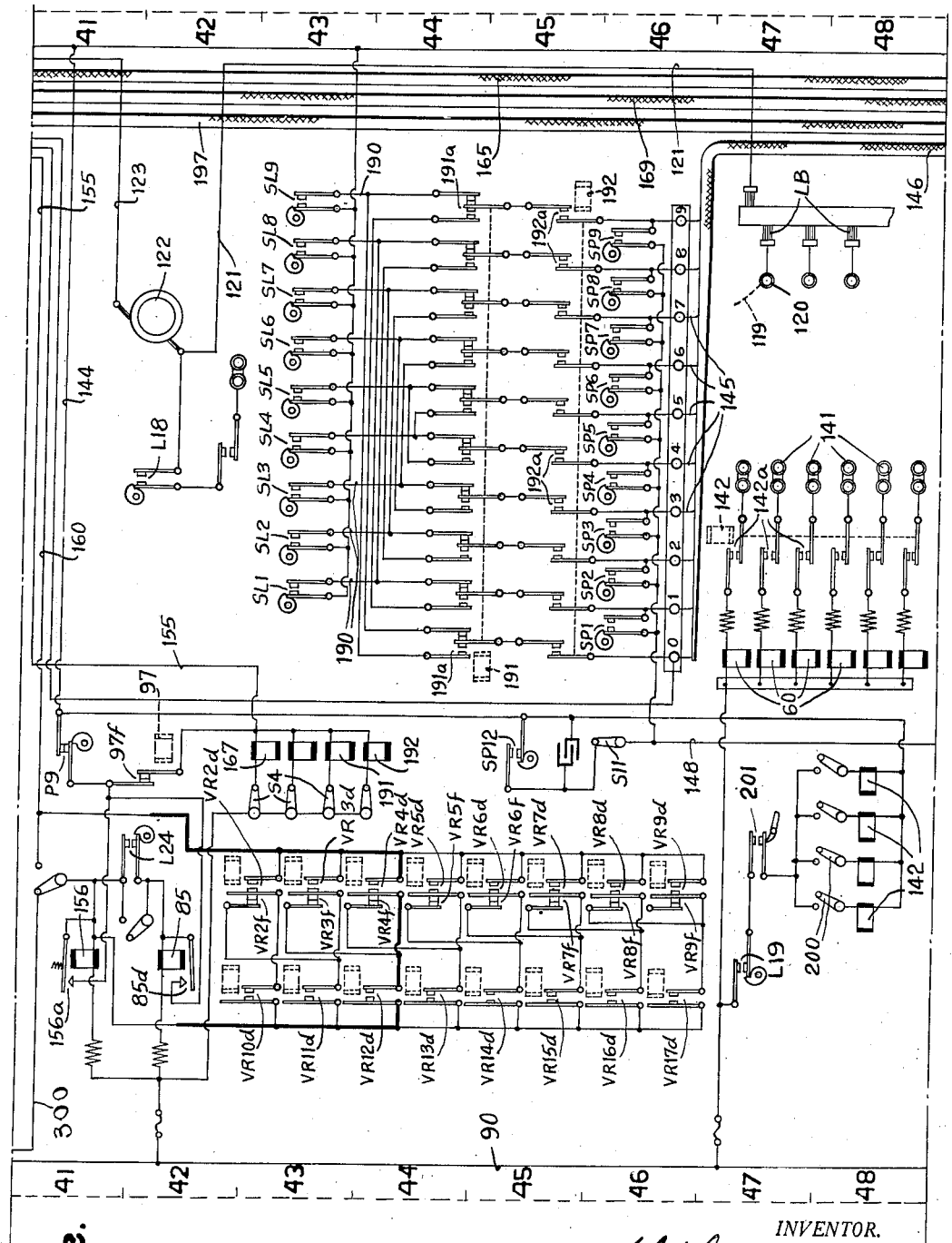

Before explaining the manner in which the comparison is made, explanation will be given of the manner in which the relays VR16 and VR4 establish connection between the two accumulators and the manner in which amounts are transferred complementarily from one to the other. In Fig. 8b at (18L) the relay magnet VR16 is adapted, upon energization, to cause closure of a group of contacts VR16a and at (20C) the relay magnet VR4 similarly closes a group of contacts VR4a. One side of each of the contacts VR16a is connected to one of a group of lines 162 designated units, tens, hundreds, etc., while the contacts VR4a are connected to a group of wires 163 similarly designated. Several of the contacts VR4a are connected to a common wire 164. The wires 162 are connected through a cable 165 and terminate at plug sockets 166 (L50). The sockets 166 are also connected to contacts 167a which in turn are connected to sockets 168 from which plug connection may be made to entering sockets 138 of the dividend accumulator. The controlling magnet 167 for contacts 167a is shown at (C43) and this magnet 167 is energized through a circuit extending from line 90, through switch S4, magnet 167, contacts 97f, P9 to line 91 so that during dividing cycles, the contacts 167a are closed. The wires 163 extend through a cable 169 (R21) to the common conducting strips 34 of the readout devices associated with the divisor accumulator.

Referring now to Fig. 8b, it will be noted that with relay magnets VR4 and VR16 energized that the units order wire 163 will be connected through one of a group of wires 170 to the thousands order wire 162. This connection is emphasized in the drawing by a heavy line. Similarly, the tens order of the divisor is connected to the tens of thousands order of the dividend and so on. The relay contacts shown in the upper part of Fig. 8b are commonly known as the column selecting and column shifting mechanism which serves to properly correlate the transferring circuits which extend between the two accumulators.

*Comparing mechanism*

In Fig. 8c the relay magnets VR16 and VR4 are shown as each having a second set of contacts VR16b and VR4b respectively. These contacts serve to associate the various orders of the dividend and divisor so that a determination can be made of which is the greater. Here again the units wire of a group of wires 172 is connected through the units order contact VR4b and one of the group of wires 173 to the thousands order wire of a group designated 174 and higher orders are correspondingly associated. The connection traced is emphasized in heavy lines on the circuit diagram.

The wires 174 extend through a cable 175 to the commutator strips 41 (L35) of the dividend accumulator. The commutator segments of both the dividend and divisor accumulators each have a resistance 176 wired between the segments and common wires 177. The resistances in correspondingly numbered segment positions are equal in value and this value varies between adjacent segments; that is, the resistance values increase progressively from the zero segments to the nine segments.

The particular form of comparing mechanism which is herein described is more fully explained in my copending application Ser. No. 693,548, filed October 14, 1933, now Patent No. 2,066,783, issued January 5, 1937, and the explanation herein will accordingly be limited to as much as is necessary for an understanding of the present invention. The conducting strips 41 of the divisor accumulator are connected to wires 178, which, through cable 179, extend to resistances 180 of a Wheatstone bridge arrangement. The wires 172 extend to resistances 181 which are of value equal to that of the resistances 180. Within a branch of each bridge, except that associated with the units order, are two relay magnets 183 and 182 connected in parallel and in parallel with resistances 180 and 181. Relay magnets 182 and 183 have uni-directional current flow devices 184 and 185 in series therewith respectively. Current flow device 184 permits current to flow only in one direction and device 185 permits current to flow in the opposite direction only.

Whenever the brush structure 39 of one order of the divisor accumulator stands in the same position as the brush structure 39 in the order of the dividend accumulator with which comparison is to be effected; that is, when both brush structures are in contact with segments of like value and having the same resistance values, there will be no potential difference between the outer connections of the resistances 180 and 181 and, of course, no potential difference across relay magnets 182 and 183.

If brush structure 39 in an order of the dividend accumulator is standing at a segment 40 of higher value than the segment upon which the associated order brush 39 of the divisor accumulator is standing, there will be a difference in potential across resistance 180, 181 and across relays 182, 183. With the higher resistance 176 in the circuit of the dividend accumulator brush, current will flow through relay magnet 182. Conversely, if the brush 39 of the divisor accumulator is standing at a higher value segment, current will flow through relay 183.

The detailed operation of the device may best be explained by tracing the operations with relation to the problem of Fig. 7. It has been shown how the zeros to the left of the highest significant figures in the dividend and divisor have caused energization of relay magnets VR16 and VR4 so that their contacts VR16b and VR4b connect the wires 172 and 174. Inspection of Fig. 8c will show that with these relays energized, the highest significant figure position, which is the millions order of the dividend accumulator, is connected to the thousands wire 172. In Fig. 7 it will be seen then that the figure "2" in the dividend is to be compared with figure "7" of the divisor. The circuit involved is traceable as follows: from line 90 (Fig. 8d) through cam contacts L17 (L40), wire 177 in the millions position of the dividend accumulator, resistance 176 in the "2" position, segment 40, brush 39, common strip 41, cable 175, wire 174 (Fig. 8c), to the contact VR16b farthest to the left (L28), thence through the wire 173 shown in heavy dotted outline, to contact VR4b farthest to the left, thence through the thousands wire 172 to resistance 181 in the thousands order of the comparing device.

A parallel circuit is also traceable from line 90, through cam contacts L17 (L40), wire 177 in the thousands order of the divisor accumulator, resistance 176 in the "7" position, segment 40, brush 39, common strip 41, wire 178, cable 179 to resistance 180 (R28) in the thousands position of the comparing device. Since the number "7" of the divisor is greater than the number "2" of the dividend, current will flow through the relay 183 of the thousands device. In the hundreds order of the device a comparison has simultaneously been made between the digit "5" in the dividend and the digit "4" in the divisor, causing energization of the relay 182 in that order and in the tens position the digit "3" of the dividend has been compared with the "0" of the divisor, likewise causing energization of relay 182 in the tens position, while in the units position the greater value of the digit "8" has caused energization of the relay 183 in the units position. In Fig. 8d at (39, 40) are shown relay contacts 183a and 183b which are controlled by the relay magnets 183. Contacts 182a controlled by the magnets 182 are also shown. The relative denominational relationship of the several contacts is indicated by the letters U, T, H, etc. Included in circuit with these contacts are the relay magnets 157 and 203 and it will be observed that normally there is no circuit completed therethrough since all of the contacts 183a are normally open. For the problem selected the magnet 183 in the thousands position is energized as has been shown so that the contacts 183a in that position are closed and a circuit is accordingly traceable from line 90, through cam contacts L17 (L40), thence serially through the contacts 183b and 182a of the five highest orders, thence through contacts 183a in the thousands position, relay magnets 203 and 157 to line 91.

Relay 203 closes its contacts 203a to provide a holding circuit through contacts L7a. It will be observed that the position of the contacts in orders lower than thousands will have no effect upon the circuit. If the highest order magnet is energized or one of the magnets 182, its contacts 182a by opening would prevent the energization of relay magnet 157 through any of the lower order positions. It may thus be stated generally that when comparison of the highest order digit of the divisor and dividend is made, magnet 157 will be energized if the divisor digit is greater and will remain deenergized if the dividend digit is greater.

Referring now to Fig. 8a, the energization of magnet 157 will cause shifting of its contacts 157a, 157b to cause closure of the former and the circuit previously established through contacts 157b for the energization of magnet VR16 is broken and a new circuit is established through relay magnet VR15, which is traceable from line 90, switch S5a (L9), wire 256, relay magnet VR15, contacts 157a, now closed, contacts 151b, contacts 151a in the two higher orders, commutator brushes 158 to line 91 as already traced. The effect of deenergizing VR16 and energizing relay VR15 is to effect column shifting between the readout circuits of the divisor accumulator and the entering circuits of the dividend accumulator. Thus, inspection of Fig. 8b will show that the units order wire 163 is now connected through the contact VR4a farthest to the right through the connected wire 170, to the hundreds order wire 162 instead of to the thousands order with which it was initially connected.

*Subtracting circuits*

Up to this point it has been shown how the dividend and divisor are entered into their respective accumulators, how the zeros to the left of the first significant figures in both numbers have initially associated the readout circuits of the divisor accumulator with the entering circuits of the dividend accumulator, and how the comparing mechanism has, under control of the relative values of the highest order digits in both amounts, caused a shifting of the circuit connections where the divisor digit has been greater. It will, of course, be appreciated that where the dividend digit is greater, there is no change in the initial circuit connections established.

Subtracting operations now take place during which the complement of the divisor is added to the dividend and this operation is repeated a number of times equal to the sum of the digits of the quotient and will terminate when that number of operations has been performed. During the course of the subtracting operations, the joint action of the mechanism which determines the number of zeros present to the left of the first significant digit in the dividend accumulator and the comparing mechanism will cause shifting of the various circuits so that subtraction takes place in the proper denominational order positions of the accumulator. During subtracting operations, the cam contacts SL1–SL9 (R43) close in succession to emit impulses from line 91 to wires 190 at the corresponding entering time of the accumulators.

Since the relay magnets 191 and 192 (C43), which are in parallel with relay magnet 167, are energized, their contacts 191a and 192a will be closed and cause a reversal of the circuit connections from contacts SL1 to SL9 to the wires 145; that is, the "0" wire 145 will receive an impulse at the "9" time, the "1" wire at the "8" time, the "2" wire at the "7" time, and so on, each wire receiving an impulse at the time corresponding to its "9" complement. These impulses passing through the cable 146 to the readout devices of the divisor accumulator will continue through cable 169 (Fig. 8b), through the contacts VR4a and VR15a, cable 165, to the magnets 25 of the dividend accumulator. For the specific problem of Fig. 7, the amount standing on the readout device of the divisor accumulator is 000007408 and the amount entered into the dividend accumulator will accordingly be 999259199; that is, each order is complemented to "9" and through the column shifting device entered into the orders of the dividend accumulator as indicated. Since the entry of this amount into the dividend accumulator results in a carry operation through the highest order and which, as explained above, causes a mechanical transfer of "1" to the lowest order, the actual amount entered, as expressed on the second line of Fig. 7, is 999259200, which is the tens complement of the divisor.

The amount now standing on the dividend accumulator is 001793800, as indicated on the third line of Fig. 7. Since the divisor 740800 is still less than the new dividend figure 1793800, the relay setup remains undisturbed and during the following cycle, the complement of the divisor is again entered into the dividend accumulator, resulting in the new figure 001053000. Again the result of the comparison is the same and the complement of the divisor is subtracted for a third time, resulting in a new dividend figure 000312200. The dividend now contains three zeros to the left of the first significant figure.

This will, of itself, cause energization of the relay VR15 and further comparison of the "7" in the divisor with the "3" in the dividend will cause energization of the relay 157 so that as a result, the relay VR14 is now energized. This has the effect of causing a shift to the right of the transfer circuits so that during the fourth transfer cycle, the complement 99992592 is entered, and conditions remaining the same, this transfer is repeated as indicated on the line labelled "5th transfer cycle," and also for the sixth transfer cycle. Following the sixth transfer cycle, there result four zeros to the left of the first significant figure in the dividend accumulator. The presence of these four zeros selects the column shift relay VR14. The comparing mechanism senses that the "7" of the divisor is less than the highest order digit of the dividend, which is "8," so that no energization of the relay magnet 157 takes place and the initial selection of relay magnet VR14 remains effective so that a further seventh transfer cycle takes place without alteration of the entering circuits from the position they occupy for the sixth transfer cycle. The resulting dividend, after the seventh transfer cycle, is 000015880, which selects the relay VR14.

However, at this time, the divisor digit "7" is greater than the dividend digit "1" and the relay 157 is energized to deenergize the relay VR14 and energize relay VR13, thus effecting a further column shift and the complement of the divisor is subtracted as indicated on the line labelled "8th transfer cycle" and again on the line labelled "9th transfer cycle."

Since it has been predetermined that the quotient is to be carried out to only two places, subtracting operations will terminate at this point at which it is sensed that the divisor digit "7" is greater than the dividend digit "1" and column shifting would ordinarily take place. The manner in which this interruption is brought about will be deferred until it has been explained how the quotient is obtained in the quotient accumulator.

*Quotient entering circuits*

In Fig. 8b at (C23) are shown a group of relay contacts VR4e which are closed under control of the relay magnet VR4. At (23R) are relay contacts VR15c whose controlling coil is closed during the first transferring or subtracting cycle. With the relay contacts closed in this manner, a circuit is traceable during the first transfer cycle as follows: from line 91, contacts 97g (R22), cam contacts L16, timed to close at the "1" time in the cycle, relay contacts VR15c, the wire 195, through the associated contacts VR4e, wire 196 labelled "H," cable 197 which extends to Fig. 8f, adding magnet 25 of the quotient accumulator, contacts 25a, to line 90. Through this circuit a "1" is entered into the hundreds order of the quotient accumulator.

During the second and third transfer cycles, during which relay magnets VR4 and VR15 remain energized, the entry of "1" is repeated in the hundreds order of the quotient accumulator. During the fourth transfer cycle, relay magnet VR14 is energized, closing its contacts VR14c so that during this cycle the circuit will extend through the tens wire 196, to enter a "1" into the tens order of the quotient accumulator. Finally, during the eighth transfer cycle (see Fig. 7) a further shift occurs and contacts VR13c direct the circuit through the units wire 196 to effect entry in the units order of the quotient accumulator.

*Initiation of total taking cycles*

At (L43-46) are shown relay contacts VR2d, VR3d, VR4d . . . VR17d, which are closed by their respective relay magnets. As explained above, during the transferring operations, the relay magnet VR4 remains continuously energized and its contacts VR4d will consequently remain closed during the same period. As also explained, relays VR4 and VR13 are energized during the "9th transfer cycle" after which the remaining dividend 1064 is compared with and found to be less than the divisor 7408, thereupon causing energization of relay 157 and resulting energization of relay VR12. Upon closure of contacts VR12d a circuit will be completed from line 91, relay contacts 97g (R22), wire 160 (Fig. 8e), contacts VR4d, VR12d, relay magnet 156, to line 90. Contacts VR12d close after the ninth transfer cycle for the problem of Fig. 7 when the comparing mechanism has determined that the highest figure of the divisor is greater than the highest order figure of the final dividend. Additional contacts VR10d, VR11d, VR13d, etc. are provided to take care of the condition where the dividend after any subtracting operation contained additional zeros. For example, if after the "7th transfer cycle" of Fig. 7 the dividend in accumulator #2 were reduced to, let us say, 000,000,008, all the magnets 151 except the lowermost would be energized and, as a result, relay VR10 would be energized and cause closure of its contacts VR10d (L43). A circuit would thereupon be traceable, after the seventh cycle, from wire 160 (Fig. 8e), contacts VR4d, closed contacts VR3f and VR2f in series, contacts VR10d and relay magnet 156 to line 90.

The device comprising contacts VR2d to VR17d thus constitutes a mechanism for terminating transferring operations at anytime when the original dividend has been reduced to an amount beyond the desired range of divisibility in the case where the divisor is evenly contained in the dividend except for a very small remainder beyond the desired limits of the quotient or for terminating transferring operations after the division has been carried out to a desired number of places.

In the case where the dividend reduces to zero in all orders after any subtracting operation, all the magnets 151 (Fig. 8a) will be energized near the end of such subtracting cycle so that all the contacts 151a are closed. A circuit is then established from wire 160, brushes 158 (L9) of commutator K3, contacts 151a in series, a wire 300 (Figs. 8a, 8b, 8c, 8d and 8e), switch 301, relay 156 to line 90. This circuit thus directly energizes relay 156 when the dividend is exactly divisible by the divisor and terminates transferring operations at the time the last possible quotient digit is obtained.

A somewhat similar circuit is utilized to terminate transferring when the divisor contains only a single digit. Let us assume a divisor of, for example, the value 8 and a dividend ultimately reduced as explained to 6 with zeros in the higher orders, of course. During the cycle in which the dividend 000,000,009 is obtained, the relays 151 in all but the lowest position are energized, causing the relay VR10 to be energized. A subtracting cycle now takes place, reducing the dividend to 000,000,001 and with VR10 and VR1 energized the unit 1 and the divisor 8 are again compared, resulting in energization of relay magnet 157 and closure of its contacts 157a (Fig. 8a). Following this, a circuit is traceable from wire 160 (Fig. 8a), brushes 158 of commutator K3, contacts 151a in series in all positions but the lowermost, lowermost contacts 151b, lowermost contacts 157a, wire 300 (Fig. 8e), switch 301 and relay 156 to line 90. In this manner transferring is terminated when the quotient has been obtained to the last position of the dividend with a single digit divisor.

Energization of relay magnet 156 (L41) will close its contacts 156a to set up a holding circuit extending from line 90, relay 156, contacts 156a, contacts P9, to line 91. During the succeeding cycle, a circuit will be established from line 90, relay magnet 85 (L42), cam contacts L24, contacts 156a, contacts P9, to line 91. Magnet 85 will close its contacts 85d to provide a holding circuit through contacts P9. Relay magnet 85 upon energization will open its contacts 85b (R2) to interrupt the main drive circuit so that further accumulating operations will cease. The magnet will close its contacts 85a (R3) to initiate total taking operations by completing the circuit to the reset magnet 93. A further circuit will be completed by closure of contacts 85c (L3). This circuit is traceable from line 90, card feed clutch magnet 22, switch S3a, now in its dotted line position, contacts 85c, contacts L6 to line 91. A parallel circuit will extend through relay magnet 137 which will close its contacts 137 providing a holding circuit for the relay 137 and also for the card feed clutch magnet 22.

Since the main drive motor TM is inoperative at this time the tripping of the card feed clutch simply places it in readiness to resume card feeding when the motor TM is again placed in operation.

During the total taking and resetting cycle of operations, the amounts standing on the several accumulators may be printed in the usual manner and since these operations are well known and fully explained in the patents referred to and in my copending application, a detailed explanation will not be given herein. After total printing has been effected, the accumulators may be automatically zeroized in readiness to receive a new set of amounts. At the completion of the reset operation, the card feeding and analyzing operations are resumed in the manner set forth above and the machine will proceed to determine the new quotient.

*Recapitulation*

In the operation of the machine, a dividend and a divisor are entered into two separate accumulators, designated the dividend accumulator and the divisor accumulator. These factors may either or both be totals derived from a plurality of cards or they may be derived from but a single card. Immediately after the amounts are entered in their respective accumulators they are inspected for magnitude and column shifting relays are controlled accordingly. Thus, for a four place divisor, relay magnet VR4 (R16) is energized, for a six place divisor VR6 would be energized, and so on. The relay magnet selected in accordance with the magnitude of the divisor remains energized throughout subsequent operations. The mechanism for determining the magnitude of the dividend initially energizes one of the relay magnets VR10 to VR18 (C10–15) and this selection is retained or altered in accordance with the relative magnitude of the highest significant digits of the two amounts.

If the digit of the divisor is less than the digit of the dividend, the initial selection prevails. If the divisor digit is greater, a re-selection of the next relay is made. For example, if VR16 is initially selected, this selection is negatived and the next relay VR15 is selected. Following the inspection of the amounts for size and their comparison for relative magnitude, the machine enters upon a series of cycles which may be variously termed transferring, subtracting or dividing cycles, during which the complement of the divisor is repeatedly entered into the dividend accumulator to reduce the same by successive stages. The magnitude detecting and comparing mechanism functions throughout these transferring operations and automatically effects the appropriate column shifting and selecting operations to direct the entries into the proper denominational order positions of the dividend accumulator.

During the transferring operations, the quotient is built up in the quotient accumulator by the repeated entry of "1" in the various denominational orders and selection of the particular orders to receive these entries is under control of the column shifting mechanism.

If the dividend is exactly divisible by the divisor, the transferring operations will terminate as soon as the dividend has been reduced to zero. If the dividend is not so divisible, transferring operations will terminate after division has been carried out to a predetermined number of places. In either case, the termination of transferring is automatically followed by the total taking and resetting operations during which the quotient may be printed and also any information which may be contained in other accumulators.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is as follows:

1. In a machine of the class described having an accumulator, means for entering a dividend amount therein, a device settable to represent a divisor amount, connections between said device and said entering means, means for transferring the divisor amount in the form of a complement to the dividend accumulator through said connections, in combination with means including a set of relays controlled by said device for ascertaining the denominational position in which the highest order significant digit occurs, means including a second set of relays controlled by said accumulator for ascertaining the denominational position in which the highest order significant digit occurs, means controlled by said sets of relays for directly adjusting said connections so that the highest order of the divisor is associated with the highest order of the dividend, further means controlled by said settable device and said accumulator for comparing the divisor and dividend amounts and means controlled by said comparing means for further adjusting said connections so that the highest order of the divisor is associated with the next lower order of the dividend amount, when the highest order digit of the dividend amount is less than the highest order digit of the divisor amount.

2. In a cyclically operated dividing machine having a pair of accumulators, each having a plurality of denominational elements, means for sensing record cards for designations representing dividend and divisor amounts, means controlled by said sensing means for effecting a dividend entry in one accumulator and a divisor entry into the other accumulator, said amounts being a variable number of digital positions whereby the highest significant digit in each amount may be entered in any denominational element of the related accumulator, group control mechanism, cyclically operable means under control of the divisor accumulator for subtracting the divisor amount from the dividend accumulator, and means initiated by the group control mechanism for causing the cyclically operable subtracting means to perform successive subtracting operations, in combination with a column shift means for determining the denominational routing of the subtractive entries into the dividend accumulator, means cooperating with said dividend accumulator for ascertaining the denominational element containing the highest ordered significant digit of the dividend, means cooperating with said divisor accumulator for ascertaining the denominational element containing the highest ordered significant digit of the divisor, means controlled by both accumulators for comparing the highest digits in the dividend and divisor to ascertain which is greater and means controlled by said ascertaining and comparing means for causing said column shift means to directly route the subtractive entry of the divisor so that the highest digital value of the divisor will be subtracted from the highest digital value of the dividend when the dividend digit is greater or from the next lower digital value of the dividend when the highest digital value is less than the highest digital value of the divisor.

3. In an electrically controlled dividing machine, a dividend accumulator having a plurality of denominational elements, an entry controlling magnet for each element, means for entering a dividend into said accumulator, a divisor receiving device, means for entering a divisor digit therein, said device having a readout element, a plurality of normally incomplete circuit connections, each for connecting said readout element with a different one of said entry controlling magnets, means cooperating with said dividend accumulator for ascertaining the denominational element containing the highest ordered significant digit of the dividend, means controlled by the accumulator and the divisor receiving device for comparing the dividend and the divisor to ascertain whether the divisor digit is greater or less than the highest ordered digit of the dividend, means for rendering said ascertaining and comparing means effective concurrently, means controlled by said ascertaining and comparing means when the dividend digit is greater than the divisor digit for completing the connection between said readout element and the magnet related to the denominational element containing the said highest dividend digit, and means controlled by said ascertaining and comparing means when the dividend digit is less than the divisor digit for completing the connection between said readout element and the magnet related to the next lower dividend accumulator element.

4. The invention set forth in claim 3 in which a quotient receiving accumulator is provided having a plurality of denominational elements, an entry controlling magnet for each element, means for causing a unit to be entered in said accumulator, a plurality of normally incomplete circuit connections each for connecting said unit entering means to a different one of said magnets, each of said connections being related to one of the first named readout circuit connections, and means controlled by said ascertaining and comparing means for completing the quotient entering circuit connection related to the completed readout circuit connection and concurrently therewith.

5. In an electrically controlled dividing machine having a dividend accumulator with an entering magnet for each denominational element thereof, a divisor accumulator with a readout device for each denominational element thereof, sets of adjustable circuit connections between the readout devices and the magnets for selectively connecting the readout devices of the divisor accumulator to different magnets of the dividend accumulator for dividing operations, and means for causing the divisor to be subtracted from the dividend accumulator through said connections in combination with a readout device for each denominational element of the dividend accumulator and positioned thereby when the related dividend element is set at zero, a readout device for each denominational element of the divisor accumulator and positioned thereby when the related divisor element is set at zero, two sets of magnets, means controlled by the readout devices of the dividend accumulator related to elements in denominational positions higher than the one containing the highest significant digit of the dividend for selectively energizing a magnet in one of said sets, means controlled by the readout devices of the divisor accumulator related to elements in denominational positions higher than the one containing the highest significant digit of the divisor for selectively energizing a magnet in the other of said sets, and means controlled by both of said selected magnets for completing one of said sets of adjustable circuit connections.

6. In an electrically controlled dividing machine having a dividend accumulator with a readout device for each denominational element thereof, a divisor accumulator with a readout device for each denominational element thereof, sets of adjustable circuit connections between the readout devices of the dividend and divisor accumulators for selectively connecting the readout devices of the divisor accumulator to different readout devices of the dividend accumulator, and means controlled by said readout devices for comparing the settings thereof through said connections, in combination with a readout device for each denominational element of the dividend accumulator and positioned thereby when the related dividend element is set at zero, a readout device for each denominational element of the divisor accumulator and positioned thereby when the related divisor element is set at zero, two sets of magnets, means controlled by the readout devices of the dividend accumulator related to elements in denominational positions higher than the one containing the highest significant digit of the dividend for selectively energizing a magnet in one of said sets, means controlled by the readout devices of the divisor accumulator related to elements in denominational positions higher than the one containing the highest significant digit of the divisor for selectively energizing a magnet in the other of said sets, and means controlled by both of said selected magnets for completing one of said sets of adjustable circuit connections.

7. In an electrically controlled dividing machine having a quotient accumulator, a dividend accumulator, a divisor accumulator, a unit entering control device, a plurality of entering magnets for said quotient accumulator one for each denominational element thereof, a set of adjustable circuit connections between said unit entering control device and the entering magnets of the quotient accumulator for selectively connecting any magnet to said device for control thereby, in combination with a readout device for each denominational element of the dividend accumulator and positioned thereby when the related dividend element is set at zero, a readout device for each denominational element of the divisor accumulator and positioned thereby when the related divisor element is set at zero, two sets of magnets, means controlled by the readout devices of the dividend accumulator related to elements in denominational positions higher than the one containing the highest significant digit of the dividend for selectively energizing a magnet in one of said sets, means controlled by the readout devices of the divisor accumulator related to elements in denominational positions higher than the one containing the highest significant digit of the divisor for selectively energizing a magnet in the other of said sets, and means controlled by both of said selected magnets for completing one of the connections of said set of adjustable connections.

8. In a cyclically operated dividing machine, having a dividend entry receiving accumulator, a divisor entry receiving means, means for entering dividend and divisor values, said accumulator and receiving means each having a plurality of denominational elements, cyclically operable means under control of the divisor receiving means for subtracting a divisor value from the dividend accumulator, means for causing said cyclically operable subtracting means to perform successive subtracting operations, a column shift means for determining the denominational routing of the subtractive entries into the dividend accumulator, means cooperating with said dividend accumulator for ascertaining the denominational element containing the highest ordered significant digit of the dividend, means cooperating with the divisor entry receiving means for ascertaining the denominational element containing the highest ordered significant digit of the divisor, and means jointly controlled by said ascertaining means for causing said column shift means to directly route the subtractive entry of the divisor value so that the highest digital value of the divisor will be subtracted from the highest digital value of the dividend, the combination of comparing means controlled by said accumulator and entry receiving device for comparing the dividend and divisor amounts to ascertain whether the highest order of the dividend is less or greater than the highest order of the divisor and means controlled by said comparing means, effective when the highest divisor digit is greater than the highest dividend digit for causing said column shift means to directly route the subtractive entry of the divisor value so that the highest order value of the divisor will be subtracted from the value in the next to the highest digital value of the dividend.

9. In a cyclically operated dividing machine, having a dividend entry receiving accumulator, a divisor entry receiving means, means for entering dividend and divisor values, said accumulator and receiving means each having a plurality of denominational elements, cyclically operable means under control of the divisor receiving means for subtracting a divisor value from the dividend accumulator, means for causing said cyclically operable subtracting means to perform successive subtracting operations, a column shift means for determining the denominational routing of the subtractive entries into the dividend accumulator, means cooperating with said dividend accumulator for ascertaining the denominational element containing the highest ordered significant digit of the dividend, means cooperating with the divisor entry receiving means for ascertaining the denominational element containing the highest ordered significant digit of the divisor, and means jointly controlled by said ascertaining means for causing said column shift means to directly route the subtractive entry of the divisor value so that the highest digital value of the divisor will be subtracted from the highest digital value of the dividend, the combination of a quotient accumulator, means for entering a unit therein for each of said subtractive cycles of operation, a supplemental column shift means for determining the denominational routing of the unit entry into said quotient accumulator, and means jointly controlled by said ascertaining means for causing said supplemental column shift means to directly route the unit entry in accordance with the routing of the divisor value.

ULRICH M. W. KÖLM.